United States Patent
Coots

(10) Patent No.: US 12,503,818 B2
(45) Date of Patent: Dec. 23, 2025

(54) TIE PLATE HANDLING MECHANISM

(71) Applicant: B & B Metals, Inc., Shepherdsville, KY (US)

(72) Inventor: Coty T. Coots, Shepherdsville, KY (US)

(73) Assignee: B & B Metals, Inc., Shepherdsville, KY (US)

( * ) Notice: Subject to any disclaimer, the term of this patent is extended or adjusted under 35 U.S.C. 154(b) by 848 days.

(21) Appl. No.: 17/729,612

(22) Filed: Apr. 26, 2022

(65) Prior Publication Data

US 2022/0341098 A1    Oct. 27, 2022

Related U.S. Application Data

(60) Provisional application No. 63/179,802, filed on Apr. 26, 2021.

(51) Int. Cl.
*E01B 29/32*    (2006.01)
*B65G 15/12*    (2006.01)

(52) U.S. Cl.
CPC .............. *E01B 29/32* (2013.01); *B65G 15/12* (2013.01)

(58) Field of Classification Search
CPC .......... E01B 29/24; E01B 29/26; E01B 29/32; E01B 29/38; E01B 29/40; E01B 29/44; B65G 15/12
See application file for complete search history.

(56) References Cited

U.S. PATENT DOCUMENTS

| | | |
|---|---|---|
| 6,807,909 B1 | 10/2004 | Coots |
| 7,406,919 B2 | 8/2008 | Coots |
| 7,827,916 B2 | 11/2010 | Coots, Jr. |
| 8,166,883 B1 | 5/2012 | Coots |
| 8,316,774 B1 | 11/2012 | Coots |
| 8,393,846 B1 | 3/2013 | Coots |
| 8,443,733 B2 * | 5/2013 | Coots ..................... E01B 29/32 104/5 |
| 8,459,924 B1 | 6/2013 | Coots |
| 8,636,460 B1 | 1/2014 | Coots |
| 9,016,208 B2 | 4/2015 | Coots |
| 9,038,542 B2 | 5/2015 | Coots |
| 9,328,465 B1 | 5/2016 | Coots |
| 9,422,673 B2 | 8/2016 | Coots |
| 9,446,662 B2 | 9/2016 | Coots |
| 9,745,132 B2 | 8/2017 | Coots |

(Continued)

FOREIGN PATENT DOCUMENTS

| | | |
|---|---|---|
| CA | 2565458 A1 | 5/2007 |
| CA | 2644242 A1 | 5/2009 |

(Continued)

OTHER PUBLICATIONS

U.S. Appl. No. 17/538,174, filed Nov. 30, 2021.

(Continued)

*Primary Examiner* — Robert J McCarry, Jr.
(74) *Attorney, Agent, or Firm* — Dinsmore & Shohl LLP

(57) ABSTRACT

Present embodiments relate to one or more apparatus and method of handling tie plates for proper orientation. More specifically, but without limitation, the present embodiments relate to a method of handling tie plates, determining an orientation of the tie plate, and re-orienting the tie plate during the feeding process, if necessary.

12 Claims, 12 Drawing Sheets

(56) References Cited

U.S. PATENT DOCUMENTS

| | | |
|---|---|---|
| 9,745,150 B2 | 8/2017 | Coots |
| 9,752,286 B2 | 9/2017 | Coots |
| 10,094,071 B2 | 10/2018 | Coots |
| 10,112,215 B1 | 10/2018 | Coots |
| 10,316,471 B2 | 6/2019 | Coots |
| 10,329,100 B1 | 6/2019 | Coots |
| 10,427,876 B2 | 10/2019 | Coots |
| 10,745,208 B1 | 8/2020 | Coots |
| 10,865,527 B2 * | 12/2020 | Coots ............... B65G 47/244 |
| 11,136,726 B1 | 10/2021 | Coots |
| 11,299,859 B2 | 4/2022 | Coots |
| 2020/0141065 A1 | 5/2020 | Coots |
| 2020/0407923 A1 | 12/2020 | Coots, III et al. |
| 2021/0404122 A1 | 12/2021 | Coots |
| 2022/0010499 A1 | 1/2022 | Coots |

FOREIGN PATENT DOCUMENTS

| | | |
|---|---|---|
| CA | 2468106 A1 | 6/2009 |
| CA | 2810688 A1 | 9/2013 |
| CA | 2814607 A1 | 4/2014 |
| CA | 2843094 A1 | 8/2014 |
| CA | 3024667 A1 | 5/2019 |
| CA | 3046462 A1 | 12/2019 |
| CA | 3060645 A1 | 5/2020 |
| CA | 3085102 A1 | 12/2020 |
| CA | 3122444 A1 | 12/2021 |
| CA | 3122448 A1 | 12/2021 |

OTHER PUBLICATIONS

Canadian Patent Office; Canadian Application No. 3,140,766, filed Nov. 30, 2021.
U.S. Appl. No. 17/701,564, filed Mar. 22, 2022.
Canadian Intellectual Property Office, Patent Application No. 3,156,342, filed Apr. 19, 2022.

* cited by examiner

TIE PLATE HANDLING MECHANISM

CLAIM TO PRIORITY

This non-provisional patent application claims priority to and benefit of, under 35 U.S.C. § 119(e), U.S. Provisional Patent Application Ser. No. 63/179,802, filed Apr. 26, 2021 and titled "Tie Plate Handling Mechanism", all of which is incorporated by reference herein.

BACKGROUND

1. Field of the Invention

Present embodiments relate to one or more apparatuses and methods of handling tie plates for proper orientation. More specifically, but without limitation, the present embodiments relate to an apparatus for and a method of handling tie plates, determining an orientation of the tie plate, and re-orienting the tie plate during a handling process, if necessary.

2. Description of the Related Art

In railroad maintenance, tie plates are periodically replaced along with the rails of the railroad track. When the spent materials are removed from the railroad ties, a tie plate distribution system may be utilized to dispense tie plates on or near the railroad ties so that the tie plates may be subsequently installed. Various systems are utilized to dispense or distribute these tie plates and some systems have been created in which tie plates may be separated by a tie plate separator and then positioned on a conveyor belt for subsequent distribution along the path of the railroad track.

During either the tie plate removal process or the new tie plate distribution process, the tie plates must be handled and moved. In some situations it is desirable to orient the tie plates in a desirable manner for proper feeding and into a resultant position which is oriented for a subsequent task.

It would therefore be desirable to determine current orientation and relate to a desired orientation.

It would also be desirable to change the orientation of the tie plate, if needed, during the movement and handling of the tie plates in an automated fashion so as to limit worker interactions, which can lead to injury such as injuries, for example, to the hands, fingers, and arms.

Additionally, it would be desirable to increase the throughput of tie plates to increase efficiencies associated with distribution and therefore decrease the downtime of railroad tracks during maintenance periods when tie plate replacement is necessary.

The information included in this Background section of the specification, including any references cited herein and any description or discussion thereof, is included for technical reference purposes only and is not to be regarded as subject matter by which the scope of the invention is to be bound.

SUMMARY

The present application discloses one or more of the features recited in the appended claims and/or the following features which alone or in any combination, may comprise patentable subject matter.

The present embodiments provide a tie plate handling device which receives tie plates from a first conveyor, positions the tie plates on a table. The handling mechanism determines the orientation of the tie plate and rotates the tie plate if necessary. After, the tie plate is deposited on a second conveyor for subsequent movement and handling.

According to some embodiments, a tie plate handling mechanism may comprise a feed conveyor, a table in receiving communication with the feed conveyor, the table operably connected to an actuator to move between a first position in which a tie plate is received and supported, and a second position in which the tie plate is unsupported; and, an angled transfer surface beneath the table top which supports the tie plate in movement from a first elevation near the table top to a second lower elevation.

According to some optional embodiments, the following features may be used alone with the tie plate handling mechanism or in combination with other features and the tie plate handling mechanism. The table may receive the tie plate in a first direction and release the tie plate in a second direction. The table may be capable of changing the tie plate from a first orientation to a second orientation. The tie plate may be rotated about a vertical axis. The table may have a table top, the table top having a fixed portion and a movable portion. The actuator may be a motor which causes rotation of the tie plate between a first orientation and a second orientation. The motor may move a claw which engages the tie plate. The actuator may be a linear actuator to move the claw. The tie plate handling mechanism may further comprise a sensor to sense the presence or absence of a tie plate shoulder. The tie plate handling mechanism may further comprise a processor to receive input from the sensor and control the motor. The feed conveyor moves the tie plate in a direction parallel with a major axis of the tie plate.

According to some embodiments, a tie plate handling mechanism may comprise a feed conveyor which feeds tie plates to a table in a first direction, a sensor operably connected to a controller to determine an orientation of each tie plate of the tie plates, a first actuator which rotates the tie plate determined to require rotation from the orientation when the orientation differs from a desired orientation; and, a second actuator which moves at least a portion of a table top, to drop the tie plate to a second, lower elevation to exit the table in a second direction.

According to some optional embodiments, the following features may be used alone with the tie play handling mechanism or in combination with other features and the tie plate handling mechanism. The tie plate handling mechanism may further comprise the controller which receives a signal from the sensor and controls movement of the first actuator and the second actuator.

According to some embodiments, a method of handling a tie plate may comprise the steps of feeding the tie plate to a table in a first orientation, determining if the first orientation is a desired orientation or an undesired orientation, rotating the tie plate if the first orientation is the undesired orientation, actuating a table top to drop the tie plate to a second, lower elevation; and, exiting the table in a direction that differs from a first entrance direction of the feeding.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. All of the above outlined features are to be understood as exemplary only and many more features and objectives of the various embodiments may be gleaned from the disclosure herein. Therefore, no limiting interpretation of this summary is to be understood without further reading of the entire specification, claims and drawings, included herewith. A more extensive presentation of features, details, utilities, and advantages of the present invention is provided in the following written description of various embodiments of the invention, illustrated in the accompanying drawings, and defined in the appended claims.

BRIEF DESCRIPTION OF THE DRAWINGS

In order that the embodiments may be better understood, embodiments of a tie plate handling device will now be described by way of examples. These embodiments are not to limit the scope of the claims as other embodiments of a tie plate handling mechanism will become apparent to one having ordinary skill in the art upon reading the instant description. Non-limiting examples of the present embodiments are shown in figures wherein:

DETAILED DESCRIPTION

Figure 1:
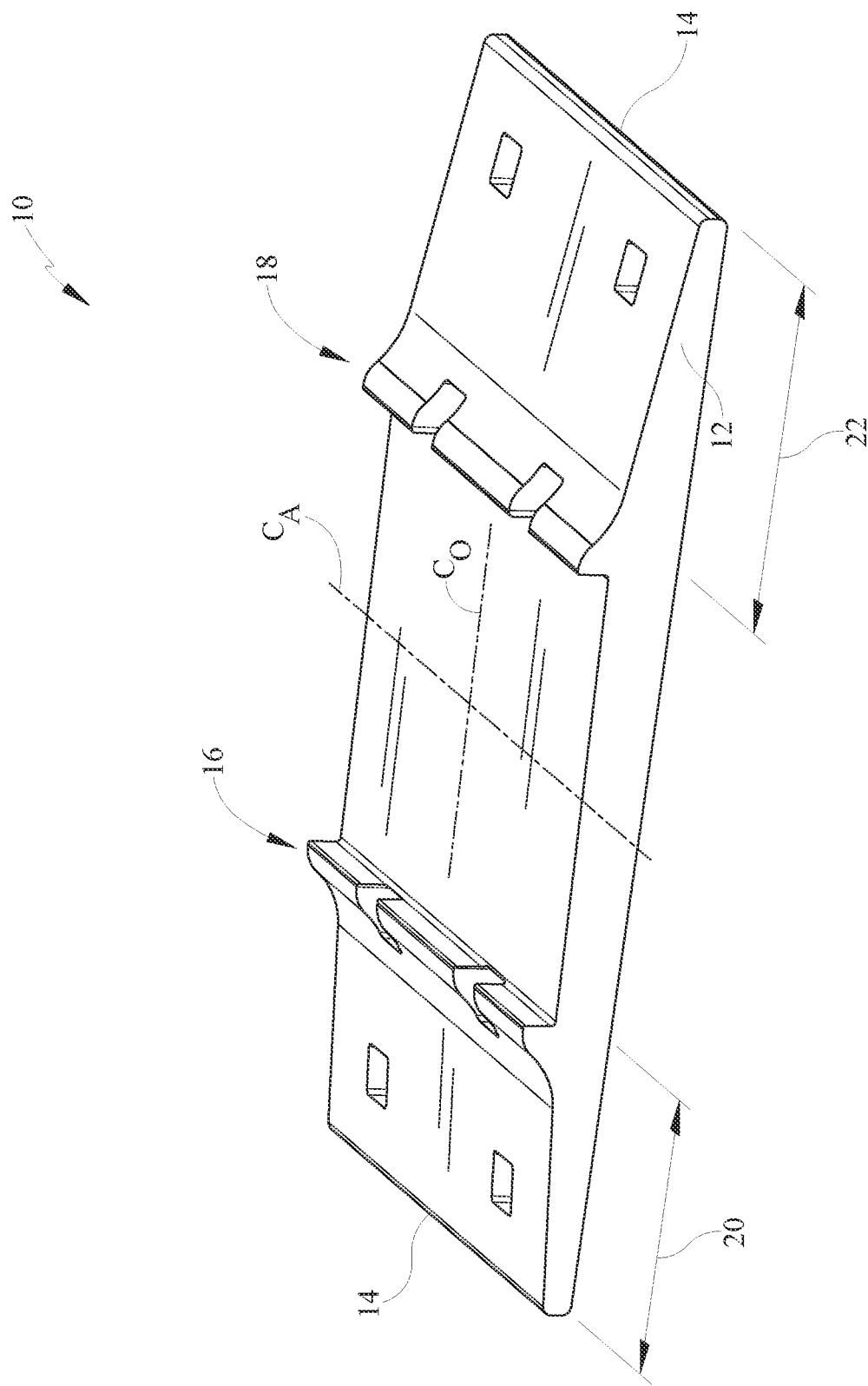
FIG. 1 depicts a perspective view of an embodiment of a tie plate.

It is to be understood that a tie plate orientation device is not limited in its application to the details of construction and the arrangement of components set forth in the following description or illustrated in the drawings. The described embodiments are capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Referring now to FIGS. 1-12, a tie plate handling mechanism is provided which may be utilized on numerous pieces of tie plate handling and/or distribution equipment. The tie plate handling mechanism determines an orientation of the tie plates being fed, rotates the tie plates if necessary and drops the tie plates in a differing discharge direction than the entrance direction.

Referring now to FIG. 1, a perspective view of an illustrative tie plate 10 is depicted. The tie plate 10 is generally rectangular in shape having two longitudinal edges 12 and two lateral edges 14 wherein the longitudinal corresponds, or may be referred to as, the long side 12 of the tie plate 10 and the lateral corresponds, or may be referred to as, the short sides 14 of the tie plate 10. The longitudinal direction is parallel to the axis $C_O$ and the lateral direction is parallel to the axis $C_A$. The tie plate 10 may travel on a conveyor in a direction of the axis $C_A$ or in a direction of the axis $C_O$. These directions are distinguished from the longitudinal direction of the conveyor which is generally in the direction of movement of the tie plates along the conveyor. Thus in some embodiments, the axis of the conveyor may align with $C_A$ of $C_O$ depending on the orientation of the tie plate 10 during travel.

The tie plate 10 also has a first shoulder 16 and a second shoulder 18. In some embodiments, the tie plate may have a single shoulder. In still further embodiments, the shoulders 16, 18 may or may not be symmetrical, but additionally may have same or differing heights. In any of these embodiments or other embodiments, the tie plate rotation is desirable for the plates 10 which are not symmetrical with regard to the shoulder(s) 16, 18. In the instant embodiment, the first shoulder 16 is closer to the closest or adjacent lateral side 14 than the second shoulder 18 is to its corresponding closest or adjacent lateral side 14. In the instant embodiment, the difference from first shoulder 16 to the closest lateral side 14 is referred to as the gauge side 20. Alternatively, at the opposite end of the tie plate 10 the distance between the second shoulder 18 and the closest lateral side 14 is referred to as the field side 22. The gauge side 20 may be a shorter dimension that the field side 22 dimension. In some embodiments, however, the field side 22 and gauge side 20 may be of equal length and if all other factors are the same, then the tie plate 10 may be centered about a center line extending through the tie plate 10 in either the latitudinal or longitudinal direction. However, some tie plates may have only a single shoulder and other tie plates may have two shoulders, as depicted, wherein the shoulders are not equilaterally positioned relative to the lateral sides. Thus the tie plate 10 may be oriented in a manner which is desirable and it may be important to determine the orientation of the tie plate 10 prior to or during the distribution process.

The instant tie plates 10 are shown as having a first shoulder spaced a first distance from an adjacent edge which differs from a second distance of a second shoulder from a corresponding second edge, opposite from and parallel to the first edge. This difference defines the field and gauge sides. Due to the different distances, the tie plate can move in either of two orientations, field side leading or gauge side leading. In the instant embodiment, the tie plates may be conveyed on the direction of axis $C_O$. The first shoulder 16 may be leading the movement or the second shoulder 18 may be leading. For purpose of clarity of explanation we will consider the first shoulder 16 the appropriate orientation to lead in the direction of movement. Therefore, in the example, if the tie plates are moving in a first orientation, the tie plate is appropriately oriented. Alternately, if the tie plates are moving in a second orientation, the tie plate orientation should be changed. It should be clear however that the need for change of orientation may relate to differing heights of shoulders or other characteristics that may be relevant. Further, the tie plates may be fed in an upright orientation depicted or an upside down orientation opposite to that shown.

Figure 2:
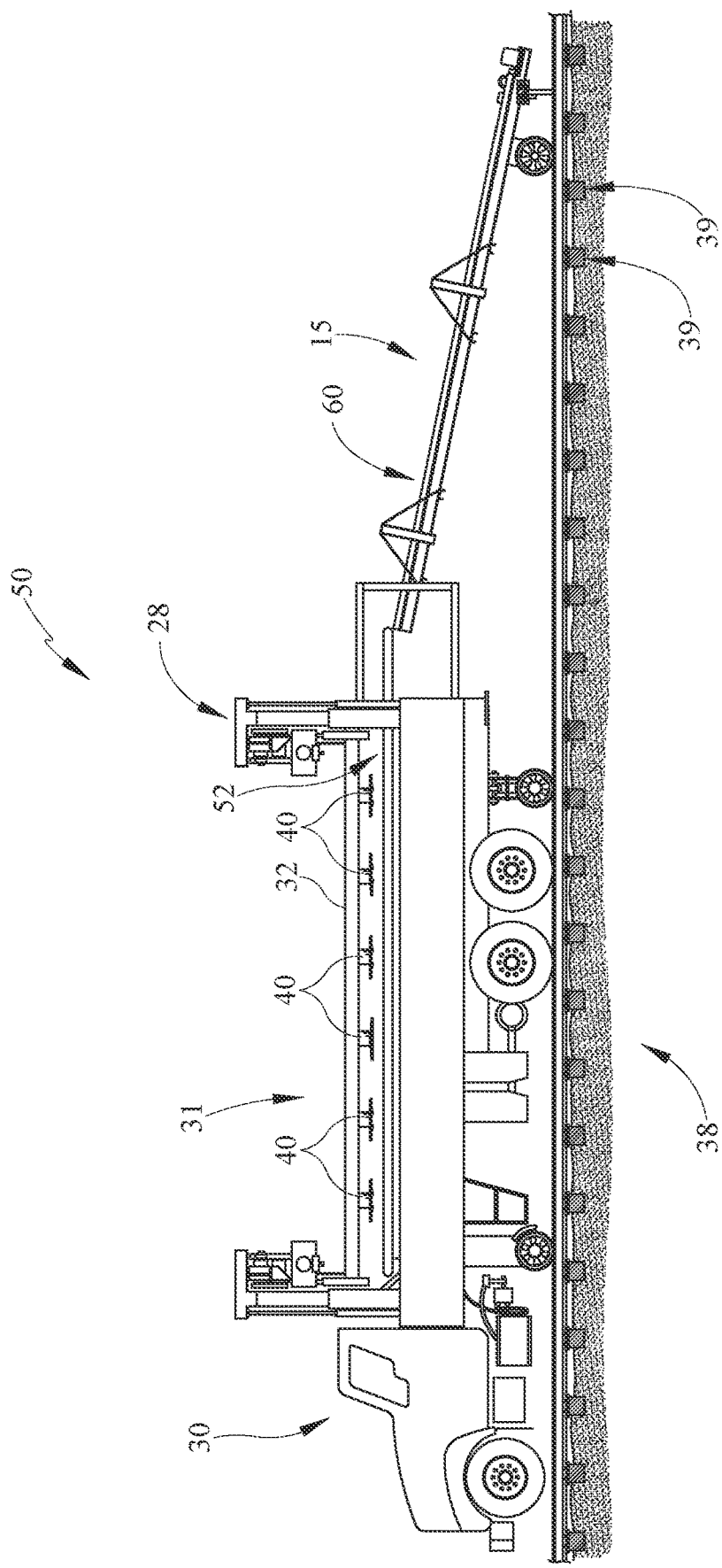
FIG. 2 depicts a side elevation view of an example tie plate dispensing system including one type of vehicle and a dispenser in tow.

Referring now to FIG. 2, a side view of an embodiment of a tie plate separator and dispensing or handling mechanism 50 is provided. Specifically, the mechanism 50 includes a vehicle 30 which in one example, may be a powered vehicle such as a hi-rail truck.

The vehicle 30 is depicted as a self-propelled vehicle and comprises an engine or motor to propel the vehicle 30 along a railroad track 38 and for on-road usage. In the instant figure, the vehicle 30 is depicted as a hi-rail vehicle which is capable of both road travel and rail travel. However, other vehicles may be utilized as will be discussed further herein.

In a bed area 31 of the vehicle 30, the separator 50 or other sorting equipment which picks up tie plates 10 from a pile of tie plates which may be located in the bed 31. A magnetic bar 32 may comprise a bar having a plurality of magnets 40 attached to the bar 32 which separate the tie plates 10 individually from the pile or group of tie plates in the bed 31 and moving the tie plates 10 to a tie plate handling system 50, comprising one or more conveyors 52. This arrangement allows for further delivery to additional processing devices. It should be noted that the term "conveyor" is utilized and is illustrative and not limited to a traditional belt or roller conveyor but may be various forms of mover devices. For example, the term conveyor(s) may comprise, but is not limited to, roller conveyors, belt conveyors, chutes, gravity feeders, vibratory feeders, or any other device or mechanism capable of conveying the tie plates from a first position to a second position. The conveyors may be indicative of a powered conveyor, a non-powered conveyor, fixed, dynamic, other devices, or any combination of any of the foregoing.

The conveyor 52 may be a powered conveyor as will be described further in order to intermittently power on and power off the operation and feed to a table 94 which orients the tie plates. Additionally, for purpose of understanding, the term "longitudinal" in reference to the conveyors refers to the long dimension of the conveyor and the term "lateral" or "latitudinal" refers to the shorter width dimension of the conveyor. In the instant description, the conveyor 52 is shown with a longitudinal direction which is aligned with the forward-rearward direction of the vehicle 30 and the direction of the railroad track 38. This orientation may however vary in other examples and applications.

The bar 32 with magnets 40 is supported at ends by a crane, in this embodiment a gantry crane 28, for upward and downward movement as well as lateral movement relative to the rail vehicle 30. Other cranes and structures may be utilized to move the tie plates 10 on to the conveyor(s) 52.

The tie plate separator system 50 and specifically the rail vehicle 30 may comprise the bed area 31 which may include at least one storage compartment with tie plates 10 and the conveyor 52 that receives and delivers tie plates 10 to the tie plate distribution, or dispenser, system 50. The tie plate conveyor 52 may be located along the center line of the bed area 31 of the hi-rail vehicle 30, or may be offset to one side. In some embodiments, the conveyor 52 may be located generally along the center of the vehicle 30 longitudinal axis and at least one storage compartment on at least side of the conveyor 52 also extending in the longitudinal direction of the hi-rail vehicle 30.

Trailing from the rear of the vehicle 30 is a tie plate distribution cart, or buggy 15. The distribution cart 15 includes at least a second conveyor 60 that moves tie plates 10 from an upper elevation to a lower elevation for distribution closer to ground level. Whereas the cart 15 is depicted with a single conveyor, other carts may comprise two or more conveyors. The distribution cart 15 is pulled along the railroad tracks 38 and dispenses the tie plates 10 at intervals according to a desired pattern. The tie plates 10 may be distributed on the railroad ties 39, between the ties, or to the side of the ties. Any of these distribution patterns may be used for subsequent installation in a subsequent process step.

The tie plate handling device 50 may be located on the vehicle 30, for example at the tie plate conveyor 52 or may be located on the distribution cart 15. The tie plate handling device 50 may be inclusive of the conveyor 52 on the vehicle 30 or the conveyor 60 on the distribution cart 15.

Figure 3:
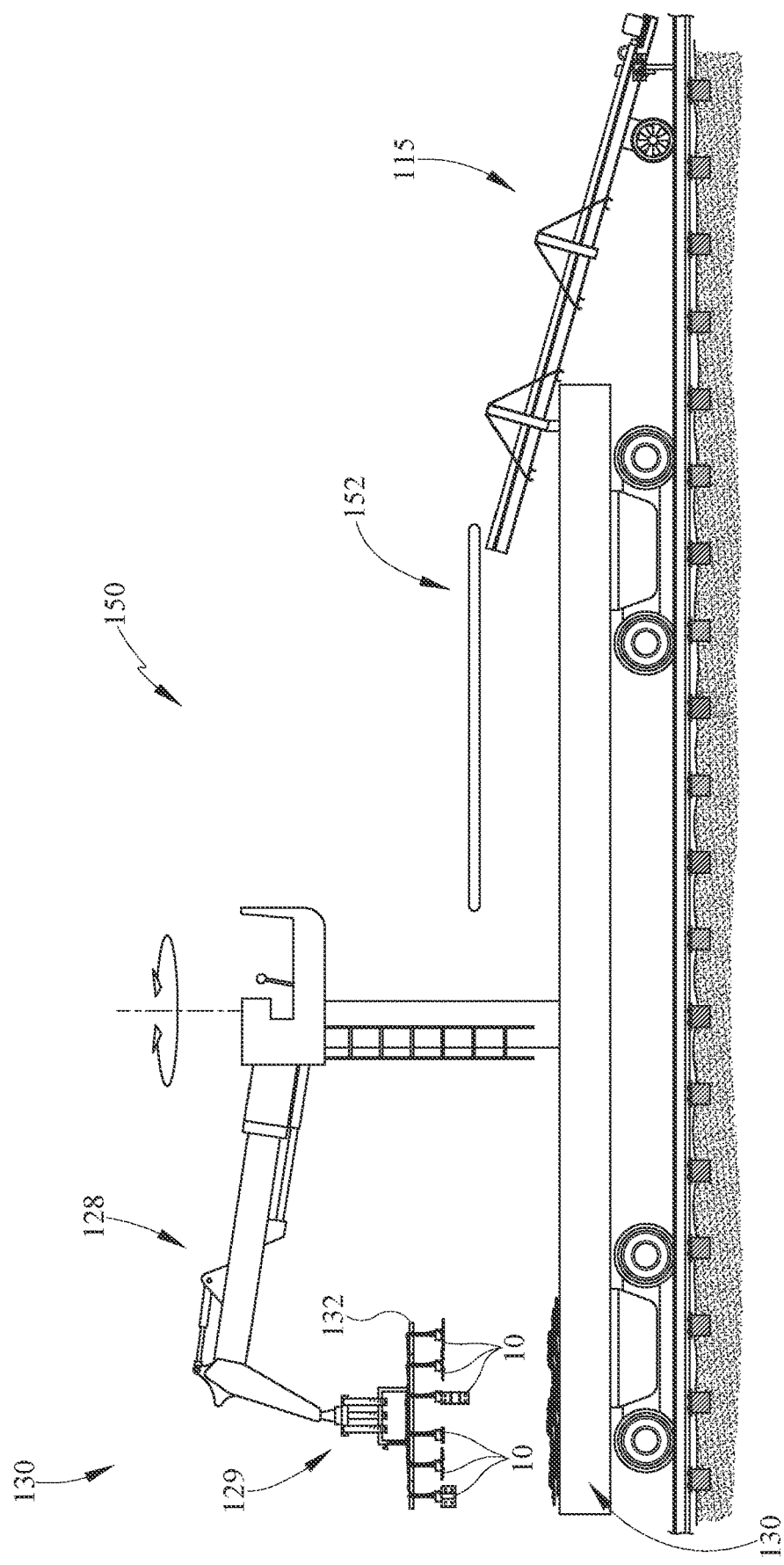
FIG. 3 depicts a side view of an alternate embodiment of a tie plate separator for a flat-bed.

With reference now to FIG. 3, a further embodiment of a tie plate handling mechanism 150 is capable of use on an alternate vehicle 130 is shown. In this embodiment, the vehicle 130 is not self-propelled but is instead capable of being towed behind a hi-rail vehicle 30 such as that of FIG. 2, or other such rail-capable vehicle. In this embodiment, the hi-rail truck 30 may be replaced by a towable flat-bed rail car 130.

Further, as an alternative to the gantry crane 28 (FIG. 2), a cantilevered crane 128 is provided for picking tie plates 10 and loading the tie plates 10 directly or indirectly on to the conveyor 152. In this embodiment, the crane 128 comprises a grappler 129 which may be used with a powered magnetic or the magnetic bar 132 at the end of the crane 128 to separate the tie plates 10 from a pile.

The embodiment of FIG. 3 also includes a conveyor 152 which receives the separated tie plate 10 and feeds them to the tie plate distribution cart or dispensing system 115. According to an embodiment of FIG. 3, an alternate separator system 150 is provided.

The distribution cart or dispensing system 15, 115 of FIGS. 2 and 3 may also include embodiments where two conveyors may be used to dispense the tie plates 10. The distribution carts 15, 115 may include a lower gate and actuator to stop and release tie plates, or may include a tire which frictionally stops each tie plate, then rotates to release tie plates individually. The actuator, tire, or other release device may be signaled by a sensor, for non-limiting example optical sensor, manually, or may operate based on a distance moved.

Figure 12:
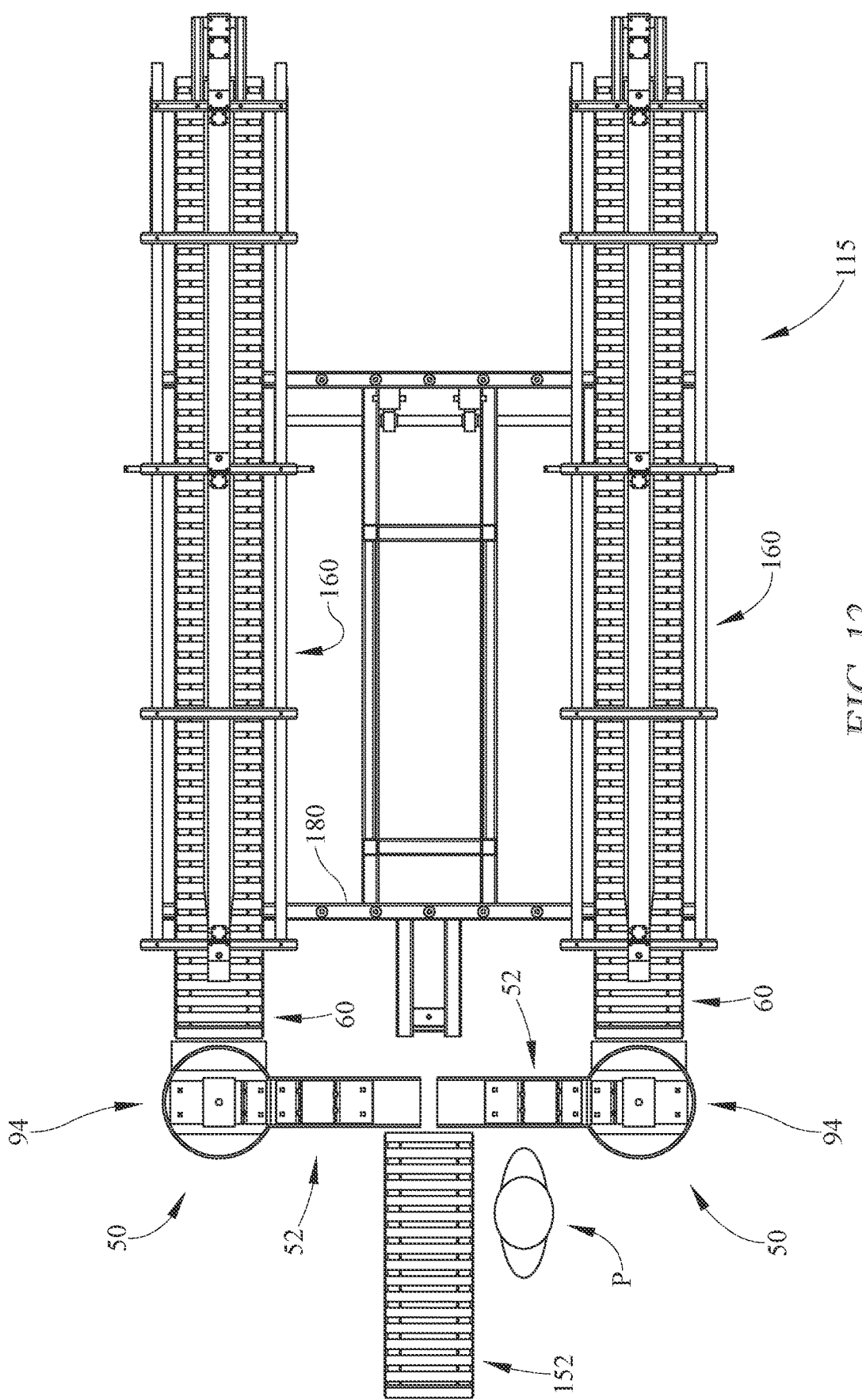
FIG. 12 is a plan view of an example wherein the tie plate handling mechanism may be used to change direction and orientation of a tie plates during a distribution process.

Referring to FIG. 12, one non-limiting example of a tie plate handling mechanism 50 is shown in operation with an example distribution buggy 115. The tie plate handling mechanism 50 may be used where there is a desire to change the direction, or the orientation, or both, away from a typical centerline feeding conveyor. This may be desirable where one or more groups of tie plates 10 are being deposited on the rail ties in an off-center location, for example outside the rails. In the example, the tie plates 10 start along a centerline feed conveyor 152 which may be, for example on vehicle 30, 130. The tie plates 10 may be guided to either of two discharge conveyors, such as conveyors 60 described further herein, or discharge conveyors 60 may feed a downstream distribution conveyor 160, as shown. In this example, distribution conveyors 160 may slide along a cross-member 180 to vary the spacing between two conveyors 160.

The tie plates 10 may be guided or manually moved by a person P directed from the feed conveyor 152 to feed conveyors 52 of the tie plate handling mechanism 50. Once the tie plates 10 are on the tie plate handling mechanism 50, the tie plates 10 may be rotated, if necessary to vary orientation, and/or change direction to move on to the discharge conveyors 60. These discharge conveyor 60 may be on the buggies 15, 115, or may feed the tie plates 10 on to the distribution conveyors of the distribution buggies 15, 115. It should be understood that this is one example of use of the tie plate handling mechanism and that this example is not to be considered limiting as other arrangements may be utilized. For example, the tie plate handling mechanism 50 is not limited to a double conveyor buggy but may be used on a single conveyor buggy where the conveyor is moved to an off centerline location.

Figure 4:
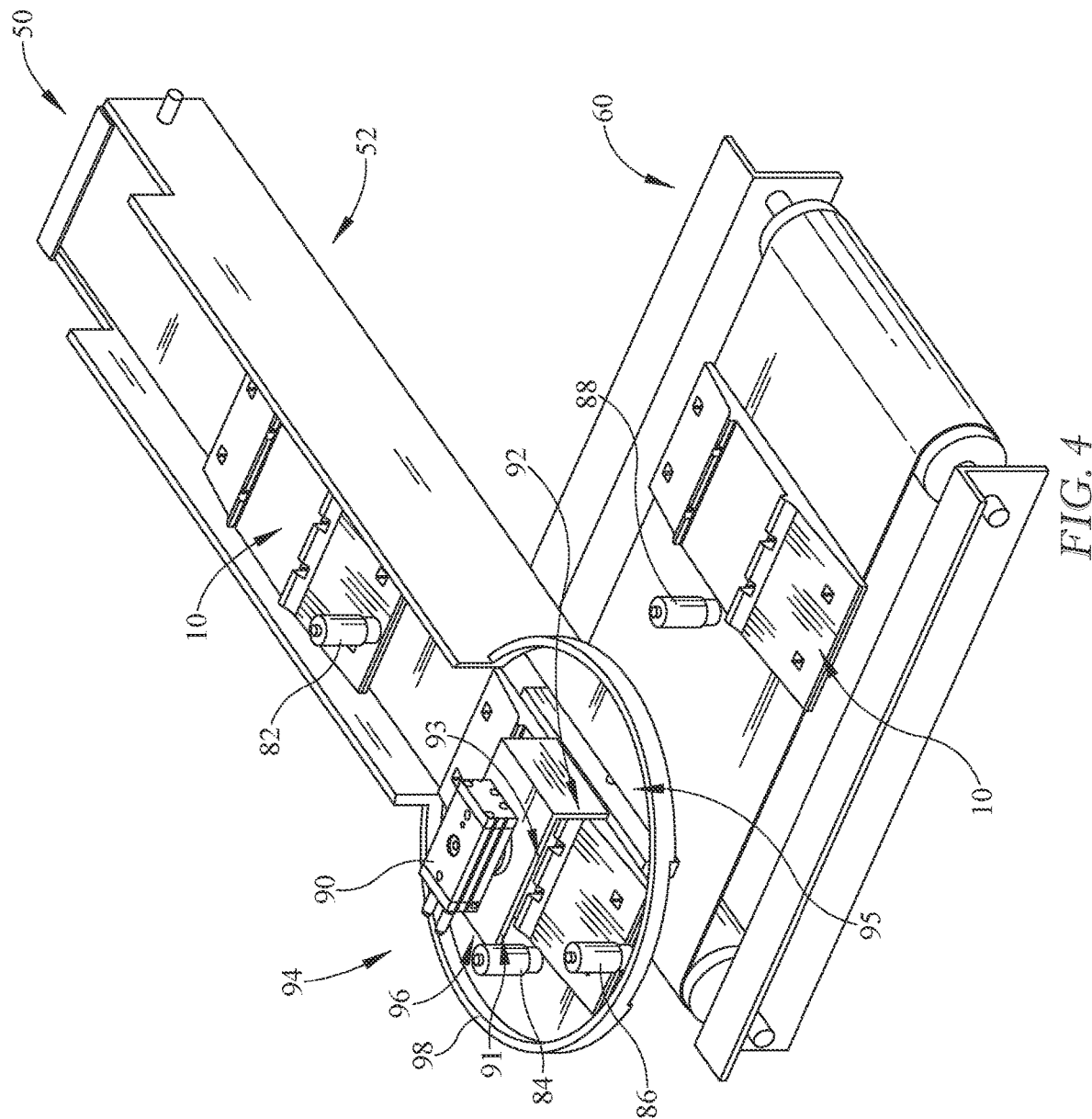
FIG. 4 is a perspective view of a material handling mechanism.

Referring now to FIG. 4, a perspective view of an embodiment of a tie plate handling mechanism 50 is provided wherein the tie plates 10 are moving in one direction, rotated and discharged in a desired orientation and in a second direction. As shown in one embodiment, a tie plate handling device 50 is provided which may be mounted in various types of vehicles 30, 130 (FIGS. 2, 3).

The tie plate handling mechanism 50 may comprise a feed conveyor 52, 152 (FIGS. 2, 3) which may be located on the vehicle 30, 130 (FIGS. 2, 3) or near the top of the distribution cart 15, 115 (FIGS. 2, 3). The feed conveyor 52 may comprise various forms. For example, the feed conveyor may include a plurality of types such as fixed conveyors such as slides or other gravity feed devices which are stationary. The feed conveyor may also include known types of conveyors such as belt conveyors or roller conveyors. Still further types of conveyors or mover devices may be used including dynamic type feeders, such as vibratory feeders. As previously discussed, the term conveyor should be construed broadly as various structures and mechanisms which move the tie plates from a first location to a second location.

In the instant embodiment, a conveyor 52 is utilized which may be gravity feed, belt feed, roller conveyor or a combination of any of these. The tie plates 10 are fed in a manner such that the tie plates 10 move in a direction which is parallel to a long axis of the tie plate. That is, the tie plates move in a direction such that axis $C_O$ (FIG. 1) is parallel to the longitudinal axis of the feed conveyor 52. In prior art systems on the other hand, the tie plates 10 are often fed in a direction which is parallel to the short dimension of the tie plate. However, the instant tie plate feed conveyor may move the tie plates in a direction which is generally oriented 90 degrees from many prior art feed conveyors as shown in FIG. 4.

The feed conveyor 52 is in feed communication with a table 94. The table 94 receives the tie plates 10 from the feed conveyor 52 and may rotate the tie plates 10 to change the orientation. In addition to changing the orientation, the table 94 may also change the direction of movement of the tie plates 10. In the depicted example, the tie plates 10 enter in a first direction movement extending in the direction of the feed conveyor 52. The tie plate 10 exits the table 94 in a second direction, which in some examples differs from the first direction. For example, the second direction may be about 90 degrees from the first direction. Additionally, as shown, in some embodiments the orientation of the tie plate may change such that the tie plates move with the axis $C_A$ parallel to the conveyor axis.

The table 94 comprises a table top 95 which supports the tie plate 10 received from the feed conveyor 52. The table top 95 may be defined by one or more structures or surfaces which may be fixed, movable, or a combination of fixed and movable.

In the example, the table 94 is generally circular in shape but other shapes may be utilized. The table 94 may comprise a fence 98 about the periphery of the table top 95 to provide a raised boundary relative to the table top 95. The fence 98 may provide a boundary to prevent undesired movement of the tie plate 10 into locations that are undesired. Additionally, the fence 98 may keep the tie plate 10 located appropriately relative to the outbound or discharge conveyor 60.

In order to change the orientation of the tie plate 10, prior to discharging the tie plate 10 from the table 94, the tie plate may be rotated. In order to change the orientation of the tie plate 10, the tie plate 10 may be rotated about a vertical rotation axis. A claw 96 is disposed above the tie plate 10 and table 94, and can engage the tie plate 10 in order to rotate the tie plate 10 a desired angular distance. The claw 96 allows movement of the tie plate 10 through the claw 96 or under, or both. Once a determination of the orientation of the tie plate 10 is made, the tie plate 10 may be rotated if needed. In the instant example, when the tie plate 10 needs to be rotated, the distance of rotation is 180 degrees, so that the tie plate 10 can be discharged in a direction 90 degrees from the feed direction.

In some embodiments, the claw 96 is generally formed as a U-shaped structure, which rotates by a motor or other actuator. The claw 96 may have two parallel fingers 91, 92 and a joining member 93 extending between the two parallel fingers 91, 92. The claw 96 may be sized wherein the space between the two parallel fingers 91, 92 is slightly larger than the short dimension of the tie plate 10, so that the tie plate 10 may slide through the u-shape of the claw 96 upon entry to the table 94. However, upon rotation of the claw 96, the tie plate 10 is engaged and therefore rotates the tie plate 10 as well.

Once the tie plate 10 is rotated into the desired orientation, if needed, the tie plate 10 may be discharged on to a second discharge conveyor 60. The second discharge conveyor 60 may take any of the previously described forms previously described.

With reference still to FIG. 4, the tie plate handling mechanism 50 may also make a determination as to the orientation of the tie plate 10, before changing the orientation. The orientation and/or position may be determined by one or more sensors 82, 84, 86, 88 which may be optical, radar based, sonic, proximity, mechanical limit switch, encoder wheel or other such sensing devices to determine the presence of and/or orientation of the tie plate 10. Specifically, the sensors 82, 84, 86, 88 may be making a determination of the presences, or lack of presence, of certain features of each tie plate 10. In some embodiments, the sensors may be measuring a distance, from the sensor to the tie plate or a feature of the tie plate in order to define a presence or not of a feature. Further, some of the sensors may function to determine presence and others may function to determine a distance dimension. The sensors 82, 84, 86, 88 may be operably connected to a controller 300 for example by wired or wireless connection in order send a signal for determinations by the controller 300. Thus the determinations may be made by the sensors or the sensors may send a signal to the controller 300 for making determinations needed.

In the depicted embodiment, there may be two sensors 84, 86 at the table.

However, this is merely a non-limiting example. In this example, one of the two sensors 84, 86, for example sensor 86, detects an edge of a tie plate 10 to determine, by a controller 300, that a tie plate 10 is present. The other sensor, for example sensor 84, may detect a specific feature of a tie plate 10, for example a shoulder 16, 18. As previously discussed, the presence of a shoulder 16, 18 may indicate that the tie plate 10 is properly oriented, or the presence of a shoulder 16, 18 may indicate that the tie plate 10 is improperly oriented and needs to be rotated. Likewise, depending on the location and programming, the lack of a shoulder 16, 18 may also be utilized to determine either proper or improper orientation. Similarly, other features of a tie plate 10 may be used to either determine proper or improper orientation.

Still further, an additional sensor 82 may be located at the feed conveyor 52 to detect a subsequent tie plate 10 to be fed to the table.

Figure 5:
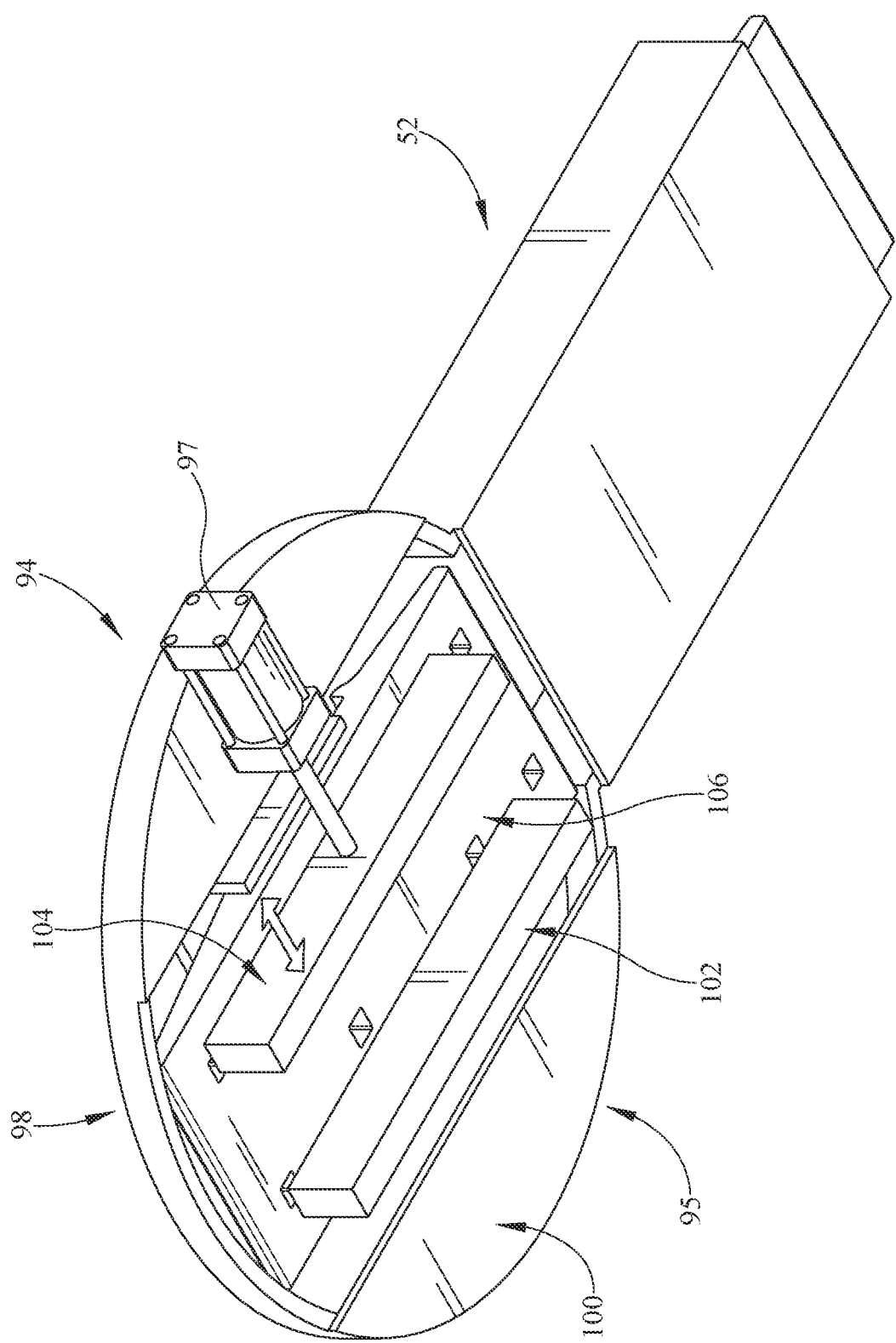
FIG. 5 is a lower perspective view of the material handling mechanism.

Referring now to FIG. 5, a lower perspective view of the table 94 is depicted with the feed conveyor 52 shown but the discharge conveyor 60 (FIG. 4) removed. The table top 95 is shown formed by multiple elements. The table top 95 may comprise fixed and movable structures. The instant embodiment has at least one fixed table top portion 100. More specifically, a first fixed table top portion 100 and a second fixed table top portion 102 are shown which support the table top 95 on the table 94. A movable table top portion 104 is also shown defining a further support for the tie plate 10 of the table 94. When the movable table top 104 is in the depicted position, the tie plate 10 is supported. When the movable table top portion 104 is moved from supporting the tie plate 10, a gap or space 106 is opened between the movable table top portion 104 and the second fixed table top portion 102. As a result, the tie plate 10 is not supported and falls through the gap or space 106. As the tie plate 10 falls, the tie plate 10 is received by the second, discharge conveyor 60. The table top portions 100, 102, 104 may be formed of various structural members and shapes. The movable table top portion 95 (FIG. 4) may include an actuator 90 to move the table top 95 and open or close the gap or space 106.

Additionally, as noted the tie plates 10 may be fed upright or upside down. In the instance that the tie plates feed in an upside down orientation (with the shoulders 16, 18 down), the table top 95 may change configuration or shape so not to engage or catch the shoulders 16, 18 to the detriment of feeding the tie plates 10.

Figure 6:
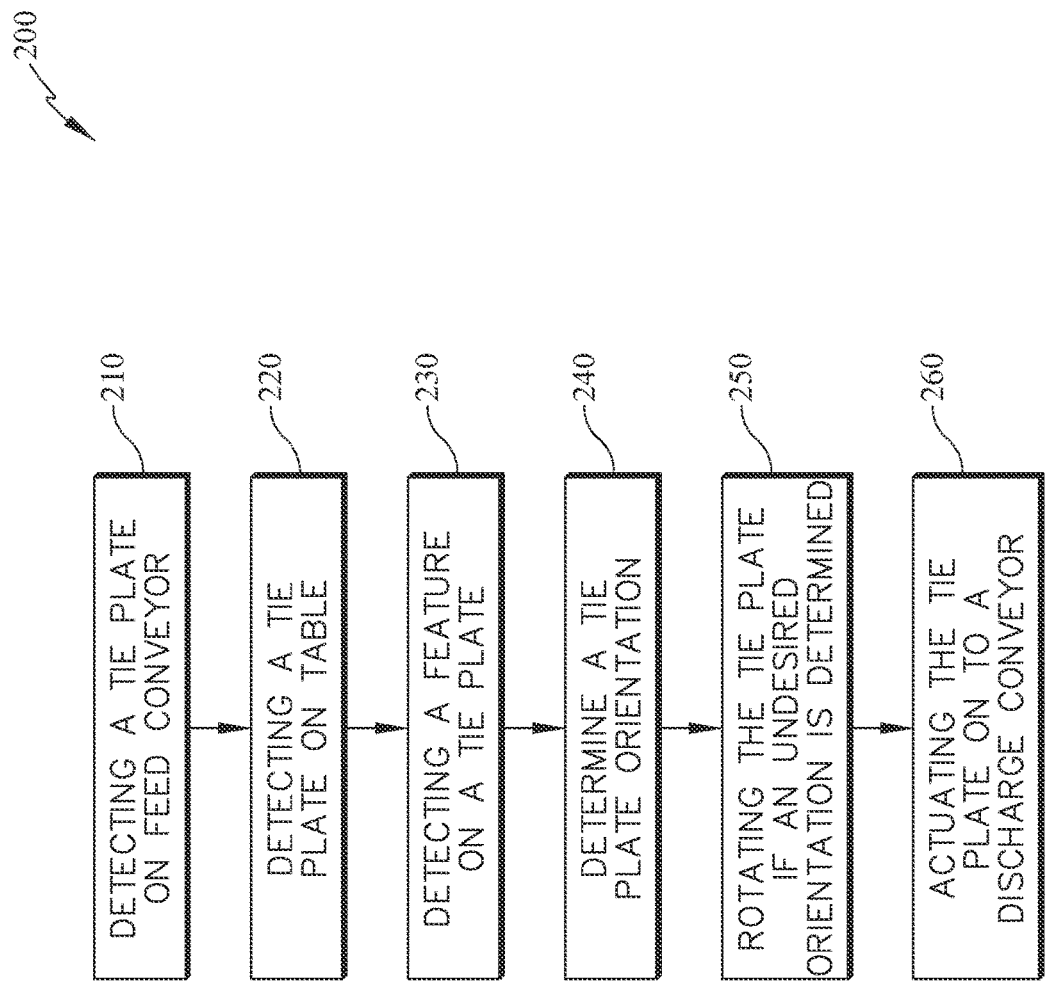
FIG. 6 is a flow chart comprising an example embodiment of a method of operation.
Figure 7:
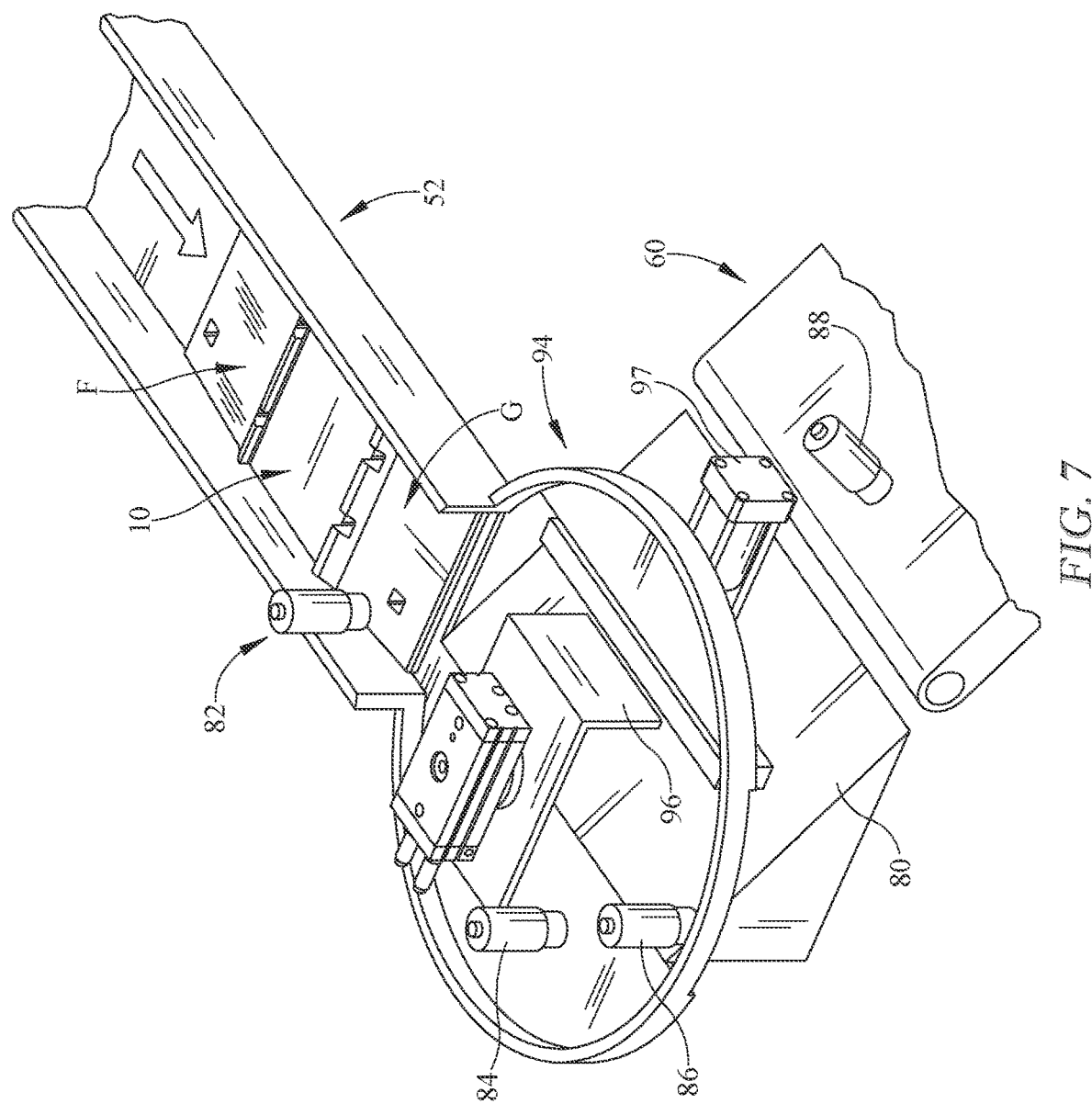
FIG. 7 is a first sequence view of the tie plate handling mechanism.

Referring now to FIG. 6, a flow chart 200 is provided depicting a method of operation. In a first step 210, a tie plate 10 may be detected on a first feed conveyor 52. The tie plate 10 may be fed to the table 94 by, gravity feed, motor, or other means. In a next step 220, the tie plate 10 is detected on the table 94.

In a next step 230, a tie plate feature, such as shoulder, edge, hole or other, is detected as present or not present. This may be for example a shoulder, a hole in the tie plate, an edge, a height of a shoulder, or other measurable feature dimension. This may be done by sending the sensor information to a controller 300 (FIG. 11) which makes a determination, based on the sensor information.

In a subsequent step 240, the orientation of the tie plate is determined. Based on firmware or software, memory, tables or the like, the controller 300 (FIG. 11) may make a determination the orientation of the tie plate.

In step 250, the rotation of the tie plate occurs. When the controller 300 determines orientation of a tie plate, the tie plate may need to be rotated. When this is needed, the actuator 90 may be used to rotate the claw 96 and the tie plate.

In step 260, once the tie plate is rotated or the determination is made that the tie plate does not need to be rotated, the second actuator moves the table top so that the tie plate can drop on to a discharge conveyor. In some embodiments, the discharge direction differs from the feed direction. In this embodiment, the discharge direction changes about 90 degrees from the input direction.

A sensor 88 (FIG. 4) may detect the tie plate on the discharge conveyor 60. When this signal is sent to the controller 300, the controller 300 may make a determination that the table 94 is clear and that the table 94 is ready to accept a next subsequent tie plate.

Referring now to FIGS. 7-10, a sequence of views is provided which shows the movement of a tie plate 10 from the feed conveyor 52, to the table 94 and to the second, discharge conveyor 60. With regard to FIG. 7, the tie plate 10 is shown on the first, feed conveyor 52. In this position, the sensor 82 detects the tie plate 10 on the feed conveyor 52, by the controller 300 (FIG. 11), and signals that the tie plate 10 is located on the feed conveyor 52. Next the tie plate 10 may be fed to the table 94, this may be by gravity feed and a gate, or by motor for a conveyor or by motor for a feeder.

Figure 8:
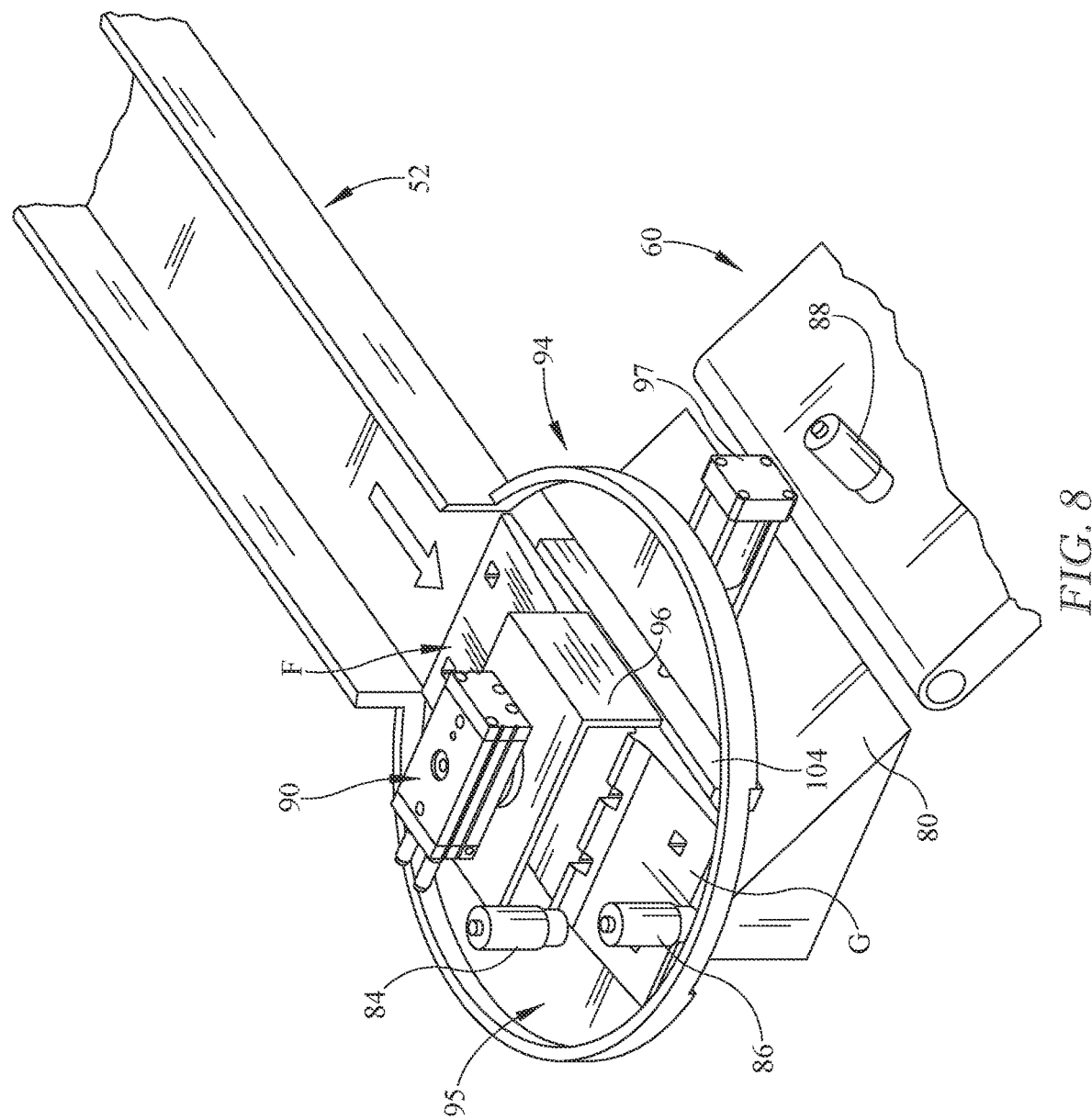
FIG. 8 is a second sequence view of the tie plate handling mechanism.

Referring now to FIG. 8, the tie plate 10 is shown moved from the feed conveyor 52 to the table 94. The tie plate 10 is supported on the table top 95. The sensor 86 is shown and detects an edge of the tie plate 10. When the signal is sent to the controller 300, the controller 300 determines that the tie plate 10 is in position. Additionally, the sensor 84 is shown sending a signal to determine if the tie plate 10 has a feature in a preselected location. For example, the sensor 84 may be used by the controller 300 to determine the orientation of the tie plate 10. In the example, the tie plate 10 is shown in an orientation which needs to be rotated about a vertical axis. Accordingly, the controller 300 may next cause actuator 90 to rotate claw 96 to rotate the tie plate 10 into the desired orientation on the table 94.

Figure 9:
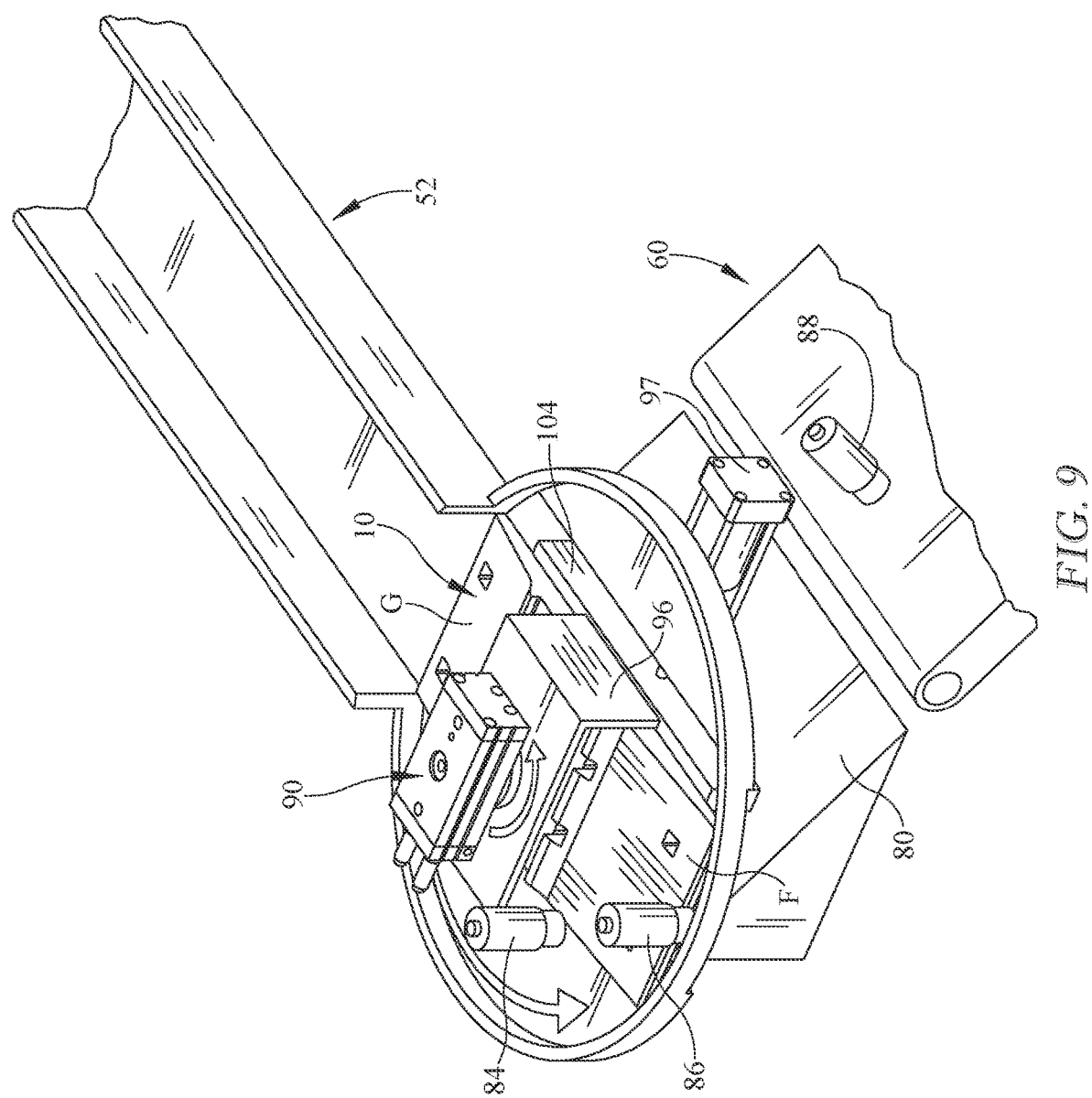
FIG. 9 is a third sequence view of the tie plate handling mechanism.

With reference now to FIG. 9, the tie plate 10 is oriented for further feeding and the actuator 97 is directed by the controller 300 to move the table top movable portion 104. First, the field F and gauge G sides are changed by comparison with FIG. 8. Additionally, when the table top movable portion 104 is moved, at least a portion of the tie plate 10 is no longer supported and the tie plate 10 can fall to a lower elevation of the second, discharge conveyor 60. The second conveyor 60 may be spaced apart so that the tie plate 10 pivots but cannot pivot beyond 90 degrees from its position on the table. An angled transfer surface such as ramp 80 may also be used to control the movement down to the second conveyor 60. Other structures may be used to control movement and prevent any over-rotation or any other undesired movement of the tie plate 10.

Figure 10:
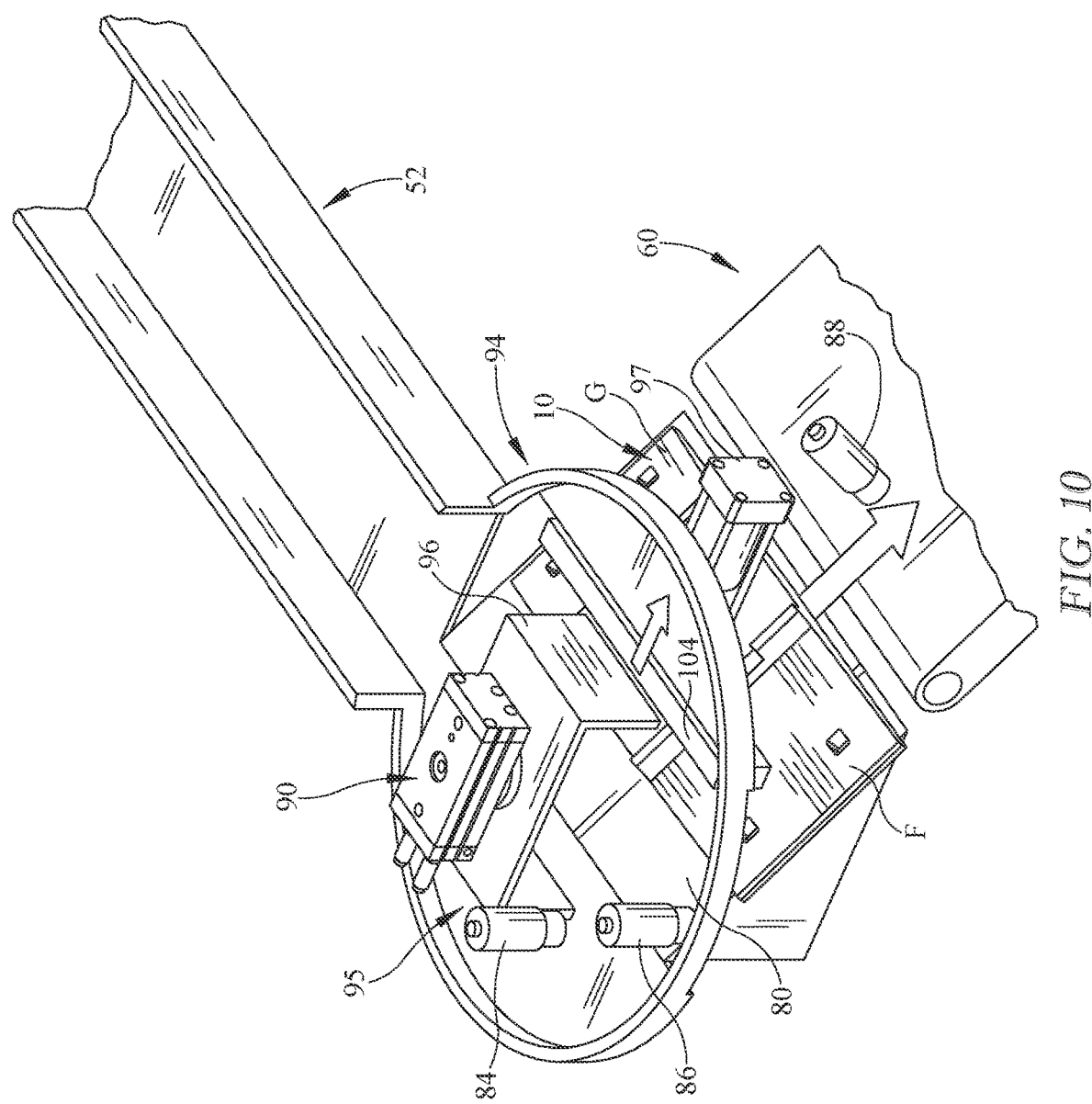
FIG. 10 is a fourth sequence view of the tie plate handling mechanism.

Finally, with reference to FIG. 10, the tie plate 10 is shown on the second, discharge conveyor 60. The tie plate 10 can be moved in a direction that differs from the first feed direction of the conveyor 52. Additionally, the orientation of the tie plate 10 relative to the discharge conveyor 60 differs from the orientation relative to conveyor 52. With movement of the first tie plate 10, a second, subsequent tie plate may be moved on to the table performing the process again.

Figure 11:
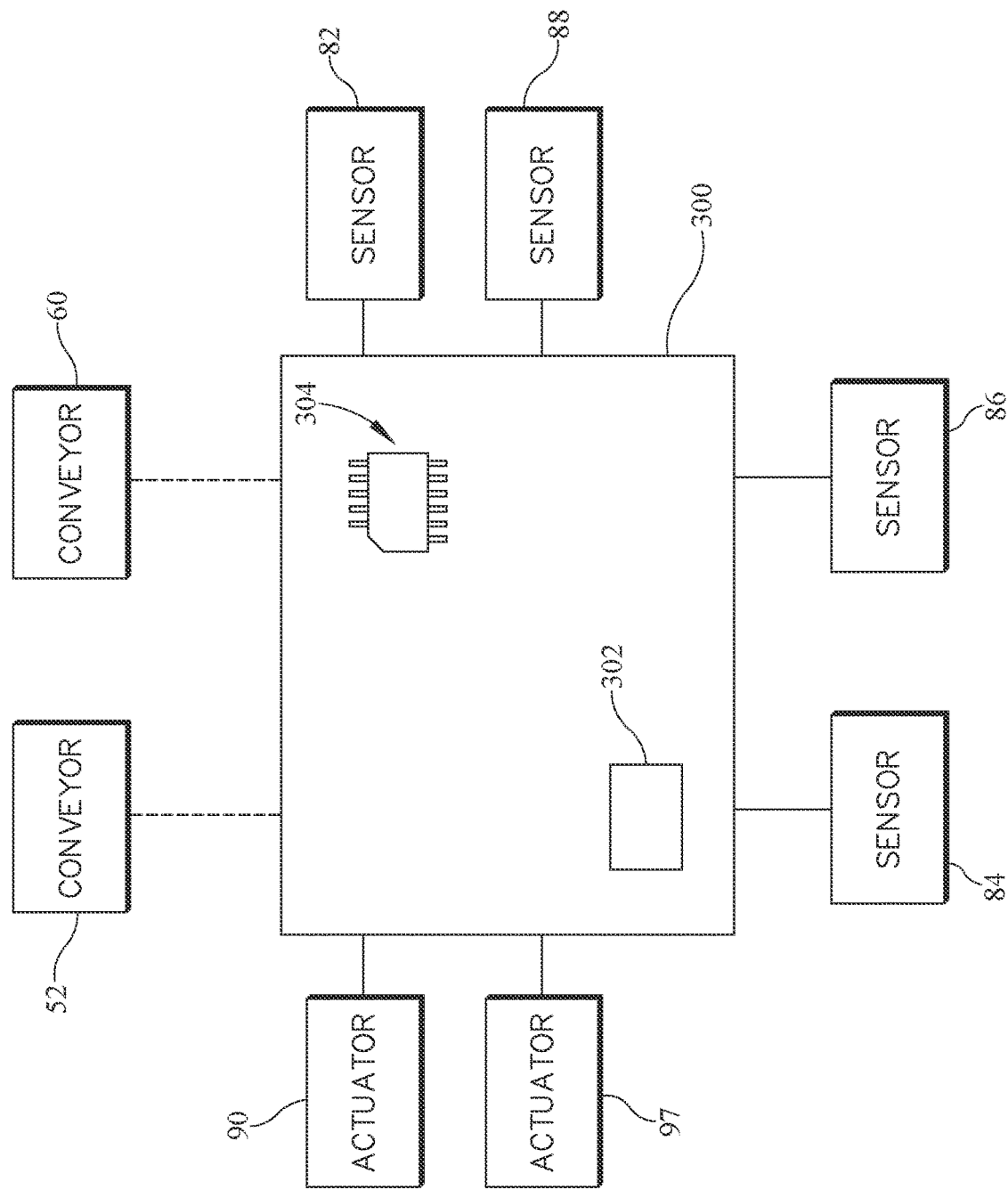
FIG. 11 is a schematic view of an example controller.

With reference to FIG. 11, a schematic view of the controller layout is shown for purpose of visualizing interaction with other structures. A controller 300 is shown and may comprise one or more processors 302 which are powered and programmed for receiving and sending signals and for decision making. The term "controller" is used herein generally to describe various apparatuses relating to the monitoring of sensor or manual input signals related to the position of the table 94 and/or the orientation of the tie plate 10 and further the performance of one or more actions in response to occurrence of certain manual or sensor signal data for example movement of conveyors 52, 60. A controller 300 can be implemented in numerous ways (e.g., such as with dedicated hardware) to perform various functions discussed herein. A "processor" is one example of a controller, or apportion of a controller, which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various implementations include, but are not limited to, conventional microprocessors, application specific integrated circuits (ASICs), and field-programmable gate arrays (FPGAs). The controller 300 may include, in some embodiments, for non-limiting example, a programmable logic controller (PLC). The PLC can be programmed to control the actuator 90, of the table top actuator 97.

In various implementations, a processor or controller may be associated with one or more storage media (generically referred to herein as "memory" 304 e.g., volatile and non-volatile computer memory such as RAM, PROM, EPROM, and EEPROM, floppy disks, compact disks, optical disks, magnetic tape, etc.). In some implementations, the memory 304 may be encoded with one or more programs that, when executed by the controller 300, perform at least some of the functions discussed herein. Memory 304 may be fixed within a processor or controller or may be transportable, such that the one or more programs stored thereon can be loaded into a processor or controller so as to implement various aspects of implementations disclosed herein.

The controller 300 is also in communication with various sensors. For example, sensors 82, 88 provide a signal to the controller 300 to detect a tie plate on the conveyors 52, 60. Additionally, sensor 88 detects when a tie plate is or is not on the table 94. Still further, the at least one sensor 84 may be used to detect a tie plate feature and use that signal to determine the orientation of the tie plate on the table 94. The controller 300 may also be in communication with one or more actuators 90. For example the actuator 90 may move the claw 96 to rotate the tie plate 10 on the table 94. In another example, the controller 300 may direct movement of actuator 97 to move the table top and drop the tie plate 10 from the table 94.

While various sensors are described, according to some embodiments, it is possible to program the controller 300 so that alternate numbers of sensors are needed. Therefore, the number of sensors shown and described in communication with controller 300 should not be considered limiting but instead should be considered one non-limiting example of many possible examples.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

The foregoing description of methods and embodiments has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

The invention claimed is:

1. A tie plate handling mechanism, comprising:
a feed conveyor;
a table in receiving communication with said feed conveyor, said table capable of receiving a tie plate from said feed conveyor;
said table operably connected to an actuator to move between a first position in which the tie plate is capable of being received and supported, and a second position in which the tie plate is unsupported;
a second actuator associated with said table, said second actuator being a motor that causes rotation of said tie plate between a first orientation and a second orientation, said second actuator moving a claw that engages the tie plate;
an angled transfer surface beneath said table which supports the tie plate in movement from a first elevation near said table to a second lower elevation.

2. The tie plate handling mechanism of claim 1, said table receiving said tie plate in a first direction and releasing said tie plate in a second direction.

3. The tie plate handling mechanism of claim 2, said table capable of changing the tie plate from said first orientation to said second orientation.

4. The tie plate handling mechanism of claim 3, said table capable of rotating said tie plate about a vertical axis.

5. The tie plate handling mechanism of claim 1, said table having a table top, said table top having a fixed portion and a movable portion.

6. The tie plate handling mechanism of claim 1 wherein said actuator is a linear actuator to move a portion of said table.

7. The tie plate handling mechanism of claim 1, further comprising a sensor to sense presence or absence of a tie plate shoulder.

8. The tie plate handling mechanism of claim 7, further comprising a processor to receive input from said sensor and control said motor.

9. The tie plate handling mechanism of claim 1 wherein said feed conveyor moves said tie plate in a direction parallel with a major axis of said tie plate.

10. A tie plate handling mechanism, comprising:
a feed conveyor which feeds tie plates to a table in a first direction;
a sensor operably connected to a controller to determine an orientation of each tie plate of said tie plates;
a first actuator which rotates the tie plate, if determined to require rotation, from said orientation when said orientation differs from a desired orientation, said first actuator rotating a claw that engages and rotates said tie plate between said orientation and said desired orientation; and,
a second actuator which moves at least a portion of a table top, to drop the tie plate to a second, lower elevation to exit the table in a second direction.

11. The tie plate handling mechanism of claim 10, further comprising the controller which receives a signal from said sensor and controls movement of said first actuator and said second actuator.

12. A method of handling a tie plate, comprising the steps of:
feeding said tie plate to a table in a first orientation;
determining if said first orientation is a desired orientation or an undesired orientation;
rotating said tie plate if said first orientation is said undesired orientation with a first actuator that rotates a claw and said tie plate;
actuating a table top with a second actuator a movable portion of said table top to drop the tie plate to a second, lower elevation; and,
exiting said table in a direction that differs from a first entrance direction of said feeding.

* * * * *